(12) United States Patent
Tachino et al.

(10) Patent No.: US 8,102,744 B2
(45) Date of Patent: Jan. 24, 2012

(54) RECORDING MEDIUM PLAYBACK DEVICE AND RECORDING MEDIUM PLAYBACK METHOD

(75) Inventors: Ryuya Tachino, Kanagawa (JP); Kenichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 974 days.

(21) Appl. No.: 12/043,505

(22) Filed: Mar. 6, 2008

(65) Prior Publication Data
US 2008/0225666 A1 Sep. 18, 2008

(30) Foreign Application Priority Data

Mar. 13, 2007 (JP) .................................. 2007-063980

(51) Int. Cl.
*G11B 5/09* (2006.01)
(52) U.S. Cl. ...................... 369/59.22; 369/53.34; 360/51
(58) Field of Classification Search ............... 369/59.22, 369/53.34, 59.1; 360/51, 46
See application file for complete search history.

(56) References Cited

U.S. PATENT DOCUMENTS

| 5,677,935 | A | 10/1997 | Karino |
| 2005/0063276 | A1* | 3/2005 | Ogura ........................ 369/59.22 |
| 2006/0203642 | A1* | 9/2006 | Kakimoto et al. ......... 369/47.31 |

FOREIGN PATENT DOCUMENTS

| JP | 11-259985 | 9/1999 |
| JP | 2001-243727 | 9/2001 |
| JP | 3377669 | 12/2002 |
| JP | 2003-59206 | 2/2003 |
| JP | 2005-93033 | 4/2005 |
| JP | 3697809 | 7/2005 |

OTHER PUBLICATIONS

Japanese Office Action issued Jul. 19, 2011, in Patent Application No. 2007-063980.

* cited by examiner

*Primary Examiner* — Will J Klimowicz
*Assistant Examiner* — Andrew Sasinowski
(74) *Attorney, Agent, or Firm* — Oblon, Spivak, McClelland, Maier & Neustadt, L.L.P.

(57) ABSTRACT

There is provided a recording medium playback device that includes a first binarization portion that binarizes, by a PRML method, a signal that is read from a recording medium, a second binarization portion that binarizes the signal based on a magnitude relationship to a specified threshold value, a first frame synchronization signal detection portion that detects a synchronization pattern in a first binarized data string that is produced by the first binarization portion, and a second frame synchronization signal detection portion that detects a synchronization pattern in a second binarized data string that is produced by the second binarization portion. If the synchronization pattern is not detected by the first frame synchronization signal detection portion, a signal that is derived from the synchronization pattern that is detected by the second frame synchronization signal detection portion is used as the frame synchronization signal.

8 Claims, 13 Drawing Sheets

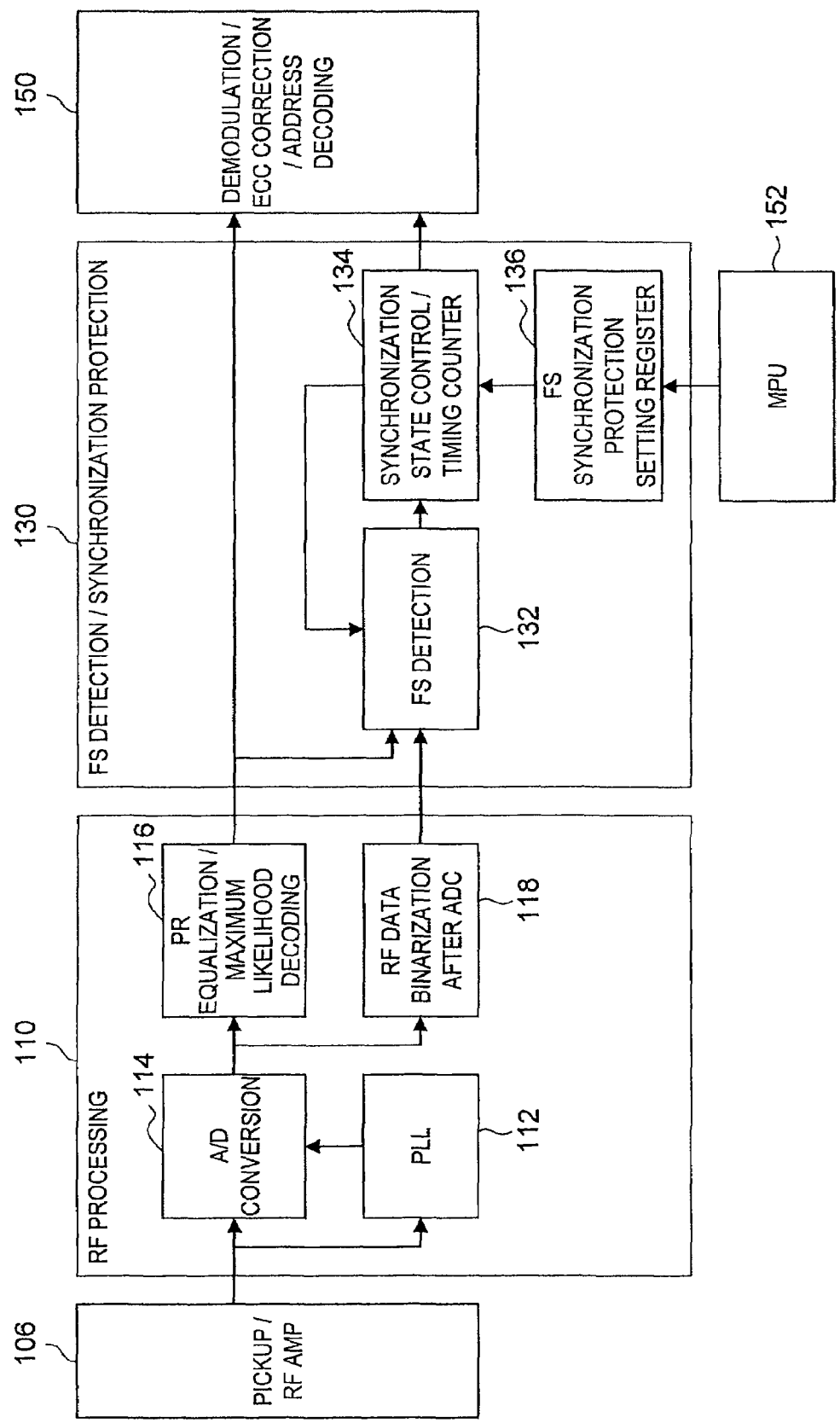

FS PATTERN DETECTION FAILED

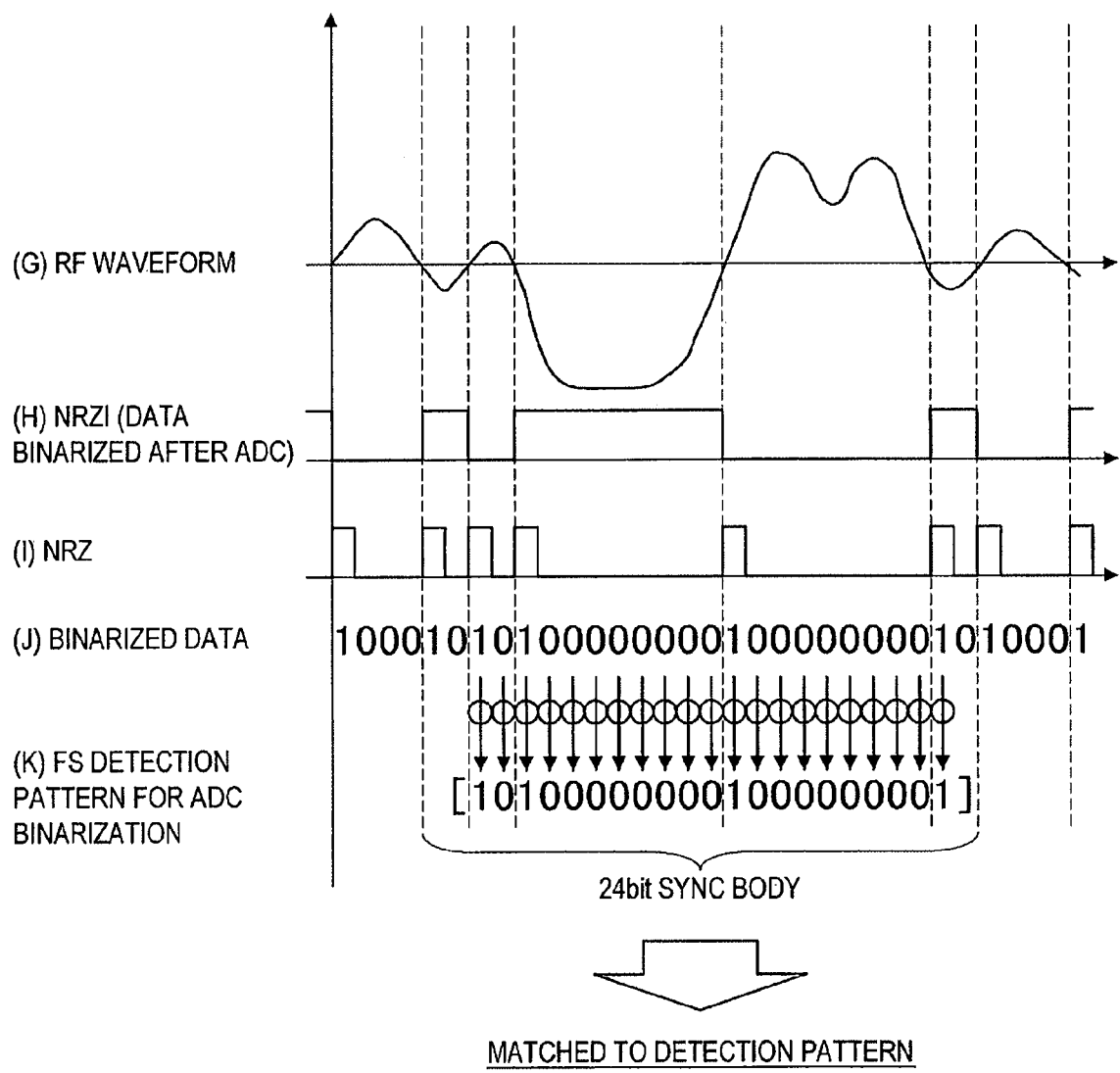

RECORDING MEDIUM PLAYBACK DEVICE AND RECORDING MEDIUM PLAYBACK METHOD

CROSS REFERENCES TO RELATED APPLICATION(S)

The present invention contains subject matter related to Japanese Patent Application JP 2007-063980 filed in the Japan Patent Office on Mar. 13, 2007, the entire contents of which being incorporated herein by reference.

BACKGROUND OF THE INVENTION

1. Field of the Invention

The present invention relates to a recording medium playback device and a recording medium playback method.

2. Description of the Related Art

Data is recorded in an optical disk recording medium, such as a compact disc, a DVD, a Blu-ray disc, or the like, for example, by forming pits on the surface of the recording medium. Information in the form of digital data is recorded by repeatedly collocating the pits (also called the "marks") with lands (also called the "spaces") outside the pits. The data that is recorded in the recording medium is generally played back using an optical disk drive apparatus. The optical disk drive apparatus irradiates the marks and the spaces of the recording medium with a light beam and reads the data based on differences in reflection from the marks and the spaces.

The data that is read undergoes signal processing by an RF processing portion and a frame synchronization signal (FS) detection and synchronization protection portion that are provided in the optical disk drive apparatus, as shown in FIG. 11, and is played back. FIG. 11 is a block diagram that shows the RF processing portion and the FS detection and synchronization protection portion of a known optical disk drive apparatus. When the data recorded in the recording medium is played back, a pickup and RF amp portion 6 first reads the digital data based on the marks and spaces on the recording medium. The RF processing portion 10 then performs binarization processing of the digital data, and a playback signal is output by the FS detection and synchronization protection portion 30. The RF processing portion 10 includes, for example, a PLL 12, an A/D conversion portion 14 and a PR equalization and maximum likelihood decoding binarization portion 16.

Next, the FS detection and synchronization protection portion 30 detects a frame synchronization signal in a data string in the binarized playback signal. The FS detection and synchronization protection portion 30 includes, for example, an FS detection portion 32, a synchronization state control and timing counter portion 34, and an FS synchronization protection setting register portion 36. Next, a demodulation and ECC correction/address decoding portion 50 performs demodulation and address decoding of the playback signal data string, based on timing information that is detected by the FS detection and synchronization protection portion 30. The detection of the frame synchronization signal is ordinarily performed by pattern matching to a unique pattern that is defined by the format as a synchronization pattern.

Various processing methods are available to perform the binarization processing of the digital data signal that is recorded in the recording medium, but in recent years, partial response maximum likelihood decoding (PRML) processing has come to be used for optical disk playback.

Note that technologies related to the detection of the synchronization signal are disclosed in Japanese Patent Application Publication No. JP-A-2001-243727, Japanese Patent Publication No. 3697809, and Japanese Patent Publication No. 3377669.

SUMMARY OF THE INVENTION

Incidentally, when a mark with a long run length is formed in an optical disk, a problem is known to occur in which, due to the state of the mark formation, the binarization is not performed correctly by the PRML processing. For example, when the digital data signal is binarized, a problem occurs in which a single mark with a long run length is incorrectly recognized as being formed of a short mark, a space, and a mark, such that an incorrect signal is played back.

In particular, in the detection of the frame synchronization signal, the synchronization pattern must be recognized correctly, but if, as a result of the PRML processing, a long mark is incorrectly recognized as a sequence of short marks and spaces, the synchronization pattern cannot be detected. This causes a discrepancy to occur between the frame demodulation timing that is required for playback and the frame demodulation timing that results from the actual reading of the data. Because the incorrect data is demodulated, the error rate becomes worse, and the playback performance deteriorates.

In known optical disk drive apparatuses, in order to detect the frame synchronization signal correctly, a method of interpolating the timing of the frame synchronization signal is implemented using a so-called forward protection function for synchronization protection. Two different interpolation methods are disclosed in the patent documents cited above. One method, used in a case where the synchronization pattern is temporarily unobtainable, interpolates the synchronization pattern as a repetition of the previously obtained synchronization pattern, based on a cycle of the correct synchronization pattern. The other method, used in a case where a slight discrepancy from the correct synchronization pattern occurs, tolerates the discrepancy in interpolating the synchronization pattern.

However, even in cases where these synchronization signal detection methods are implemented, for example, in a case where an external disturbance causes a cycle slip to occur in a phase synchronization circuit (PLL) for the playback signal, a discrepancy ultimately occurs between the frame demodulation timing that is required for playback and the frame demodulation timing that results from the actual reading of the data. Moreover, in a case where the synchronization pattern is continuously misread, it is impossible to recognize the cycle of the correct synchronization pattern, so a problem occurs whereby the timing of the frame synchronization signal cannot be interpolated.

Accordingly, the present invention addresses the problems described above to provide a recording medium playback device and a recording medium playback method that are new and improved and that can improve the detection of the frame synchronization signal by detecting the synchronization pattern reliably.

According to an embodiment of the present invention, there is provided a recording medium playback device that includes a first binarization portion, a second binarization portion, and a frame synchronization signal detection portion. The first binarization portion, using the partial response maximum likelihood decoding processing, binarizes the signal that is read from the data that is recorded in the recording medium. The second binarization portion binarizes the signal based on a magnitude relationship to a specified threshold value. The frame synchronization signal detection portion detects the frame synchronization signal in the data that have been processed by the first binarization portion and the second binarization portion. The frame synchronization signal detection portion includes a first frame synchronization signal detection portion and a second frame synchronization signal detection portion. The first frame synchronization signal detection portion detects the synchronization pattern in a first binarized data string that is produced by the first binarization portion. The second frame synchronization signal detection portion detects the synchronization pattern in a second binarized data string that is produced by the second binarization portion. If the synchronization pattern is not detected by the first frame synchronization signal detection portion, a signal that is derived from the synchronization pattern that is detected by the second frame synchronization signal detection portion is used as the frame synchronization signal.

In this configuration, even if the synchronization pattern is not detected in the data that is binarized by the partial response maximum likelihood decoding processing, the synchronization pattern is detected in the data that is produced by binarizing the signal based on the magnitude relationship to the specified threshold value. It is therefore possible to detect the synchronization pattern reliably and to improve the detection of the frame synchronization signal. The specified threshold value may be zero, for example, and in that case, the second binarization portion performs the binarization according to a zero crossing of the signal that is read from the recording medium.

The first frame synchronization signal detection portion may determine by a pattern matching whether the first binarized data string is the synchronization pattern and whether the first binarized data string is a detection pattern. When the synchronization pattern is not detected and the detection pattern is detected in the first binarized data string, the signal that is derived from the synchronization pattern that is detected by the second frame synchronization signal detection portion may used as the frame synchronization signal. This configuration makes it possible to determine whether or not the first frame synchronization signal detection portion detects the synchronization pattern based on the detection pattern, which may be stored in advance in the first frame synchronization signal detection portion, for example. The detection pattern is a pattern that may predictably occur if the desired synchronization signal is misread.

The first frame synchronization signal detection portion may exclude a specified bit from the first binarized data string when it performs the pattern matching. This configuration makes it possible to reduce the number of the detection patterns that must be set in advance for pattern matching, thus making it possible to detect the synchronization pattern more quickly.

The second binarization portion may perform a high frequency emphasis processing of the signal that is read from the recording medium before it binarizes the signal. This configuration makes it possible to amplify the signal that is read from the data that is recorded in the recording medium, thus making it possible to reliably exceed the specified threshold value. This makes it possible for the second binarization portion to perform the binarization more accurately.

Furthermore, according to another embodiment of the present invention, there is provided a recording medium playback device that includes a first binarization portion and a second binarization portion. The first binarization portion, using the partial response maximum likelihood decoding processing, binarizes the signal that is read from the data that is recorded in the recording medium. The second binarization portion binarizes the signal based on a magnitude relationship to a specified threshold value. The synchronization pattern is detected in a binarized data string that is produced by the second binarization portion, and a signal that is derived from the synchronization pattern is used as the frame synchronization signal. The data that is processed by the first binarization portion is used only for playback of the data.

According to the embodiments of the present invention described above, it is possible to detect the synchronization pattern reliably and to improve the detection of the frame synchronization signal.

BRIEF DESCRIPTION OF THE DRAWINGS

FIG. 2 is a block diagram that shows an RF processing portion and an FS detection and synchronization protection portion according to the first embodiment;

FIG. 10B is a timing chart that shows a detection of a frame in the data that is binarized by the RF data binarization after A/D conversion portion according to the first embodiment.

DETAILED DESCRIPTION OF THE PREFERRED EMBODIMENTS

Figure 1:
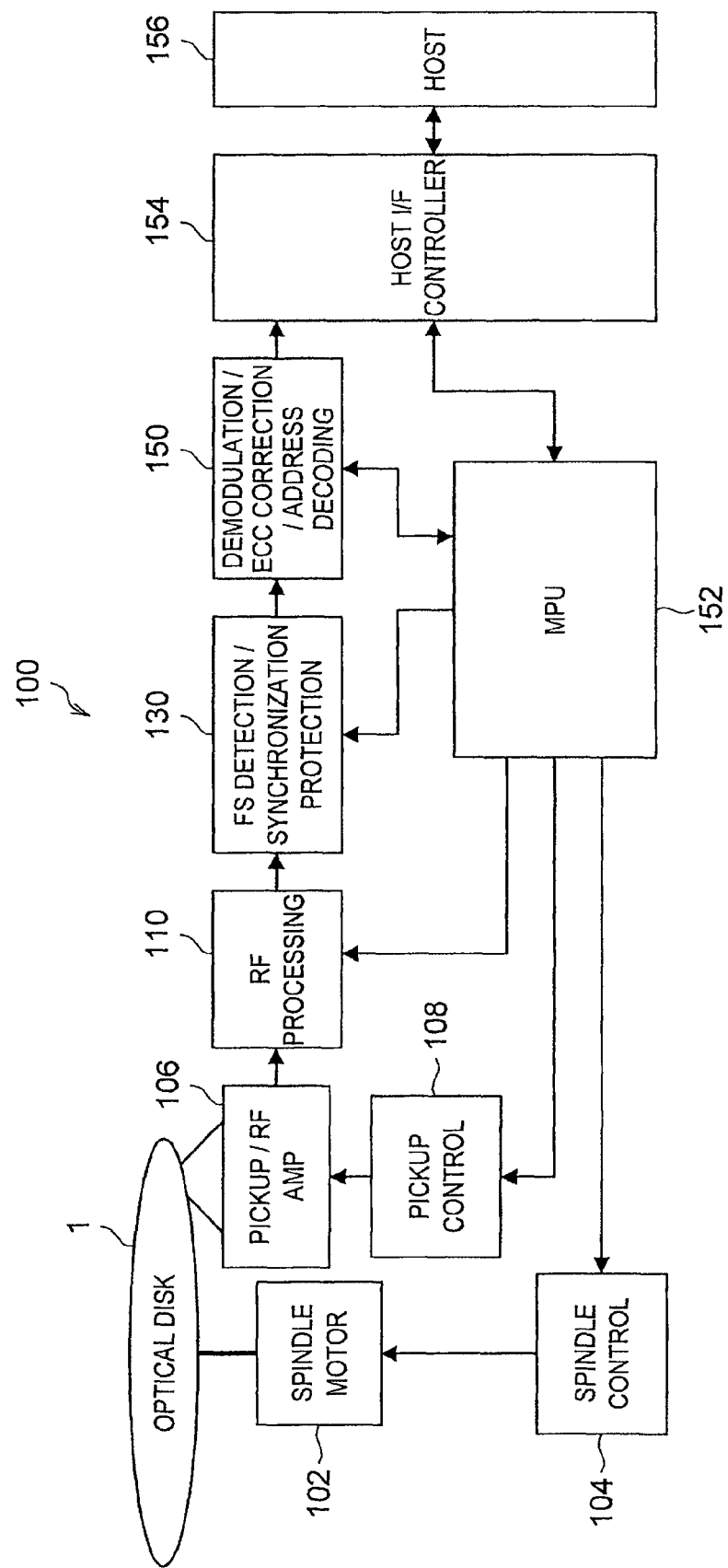
FIG. 1 is a block diagram that shows an optical disk drive apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, a configuration of an optical disk drive apparatus according to a first embodiment of the present invention will be explained. FIG. 1 is a block diagram that shows the optical disk drive apparatus according to the first embodiment of the present invention.

The optical disk drive apparatus 100 reads data that is recorded in an optical disk 1 as a recording medium and plays back video and audio data. The optical disk drive apparatus 100 may be a playback-only device that only reads the data that is recorded in the optical disk 1. The optical disk drive apparatus 100 may also be, in addition to a playback device, a recording and playback device that also includes a recording unit that records data in the optical disk 1. Note that the optical disk 1 is a recording medium such as a compact disc, a digital versatile disc (DVD), a Blu-ray disc, or the like, for example. In the optical disk 1, the data is recorded by forming pits in the surface of the recording medium. Information in the form of digital data is recorded by repeatedly collocating the pits (also called the "marks") with lands (also called the "spaces") outside the pits.

The optical disk drive apparatus 100 includes a spindle motor 102, a spindle control portion 104, a pickup and RF amp 106, a pickup control portion 108, an RF processing portion 110, an FS detection and synchronization protection portion 130, a demodulation and ECC correction/address decoding portion 150, a micro processing unit (MPU) 152, and a host I/F controller 154.

The spindle motor 102 performs rotary drive of the optical disk 1. The spindle control portion 104 receives a signal from the MPU 152 and controls the spindle motor 102. The pickup and RF amp 106 reads (plays back) a digital data signal that is recorded in the optical disk 1 and controls amplification gain. The pickup control portion 108 controls a pickup operation of the pickup and RF amp 106. Specifically, the pickup control portion 108 controls a focus motor (not shown in the drawings), a tracking motor (not shown in the drawings), and a sled motor (not shown in the drawings) to tilt a pickup in a focus direction and a tracking direction and to move the pickup in the radial direction of the optical disk 1.

The RF processing portion 110 receives the signal that is read (played back) by the pickup and RF amp 106 and outputs a binarized playback signal data string after controlling the signal in a phase synchronization circuit (PLL), controlling waveform equalization, and performing a partial response maximum likelihood decoding (PRML) processing. The binarized playback signal data string is non-return to zero inverse (NRZI) data, hereinafter also called the "RF data". The RF data is output to the FS detection and synchronization protection portion 130. The RF processing portion 110 will be explained in detail later.

The FS detection and synchronization protection portion 130 detects a frame synchronization signal in the RF data that is input from the RF processing portion 110 and performs synchronization protection based on timing information in the frame synchronization signal. The FS detection and synchronization protection portion 130 will be explained in detail later.

The demodulation and ECC correction/address decoding portion 150 receives the RF data and the frame synchronization signal timing from the FS detection and synchronization protection portion 130 and performs demodulation processing. In so doing, the demodulation and ECC correction/address decoding portion 150 performs synchronization protection for a frame synchronization signal ID and address synchronization protection. The demodulation and ECC correction/address decoding portion 150 also performs ECC correction and decoding processing of the demodulated signal.

The decoded data is output to the host I/F controller 154. The data that has been read from the optical disk 1 and undergone the series of processes described above is then output to an external host 156 through the host I/F controller 154.

The MPU 152 performs overall control of the optical disk drive apparatus 100. For example, the MPU 152 controls the spindle control portion 104, the pickup control portion 108, the RF processing portion 110, the FS detection and synchronization protection portion 130, the demodulation and ECC correction/address decoding portion 150, and the host I/F controller 154.

The host 156 is a device that is external to the optical disk drive apparatus 100 and is a computer or an audio-visual (AV) system device, for example.

Next, the RF processing portion 110 and the FS detection and synchronization protection portion 130 according to the present embodiment will be explained in detail with reference to FIG. 2. FIG. 2 is a block diagram that shows the RF processing portion 110 and the FS detection and synchronization protection portion 130 according to the present embodiment.

The RF processing portion 110, as described above, receives and performs the binarization processing of the signal that is read by the pickup and RF amp 106 and outputs the binarized playback signal data string to the FS detection and synchronization protection portion 130. The RF processing portion 110 includes a PLL 112, an A/D conversion portion 114, a PR equalization and maximum likelihood decoding binarization portion 116, and an RF data binarization after A/D conversion portion 118.

The PLL 112 is a phase synchronization circuit that performs frequency control of the signal that is input to the RF processing portion 110 from the pickup and RF amp 106. The PLL 112 also generates a synchronization clock. The A/D conversion portion 114 uses the synchronization clock generated by the PLL 112 to convert the signal that is input to the RF processing portion 110 from an analog signal to a digital signal (A/D conversion).

The PR equalization and maximum likelihood decoding binarization portion 116 uses a partial response method (PR method) and a maximum likelihood decoding (ML) method (hereinafter sometimes collectively called the "PRML method") to binarize the signal that was converted by the A/D conversion portion 114. The method of the signal processing by the PRML method according to the present embodiment is the same as the ordinary PRML method, so a detailed explanation is omitted. By using the PRML method, the optical disk drive apparatus 100 can play back a data string with a high recording density and can further reduce distortion of the signal that is played back. The playback performance can thus be improved.

The PR equalization and maximum likelihood decoding binarization portion 116 outputs the binarized signal to an FS detection portion 132 of the FS detection and synchronization protection portion 130 and to the demodulation and ECC correction/address decoding portion 150.

The RF data binarization after A/D conversion portion 118 binarizes the signal that was converted by the A/D conversion portion 114 by, for example, detecting a zero crossing timing for the signal. The RF data binarization after A/D conversion portion 118 may also perform a high frequency emphasis processing of the A/D converted signal before performing the binarization processing. In order to obtain a correct result in a case where the binarization is performed by detecting the zero crossing timing, as it is in the present embodiment, it is absolutely necessary for the signal that is input to the RF data binarization after A/D conversion portion 118 to cross zero at a desirable position. However, when a short bit or a short space is formed in the optical disk 1 because a channel clock cycle T is short, cases occur in which the signal does not cross zero when the short bit or the short space is played back.

Figure 3A:
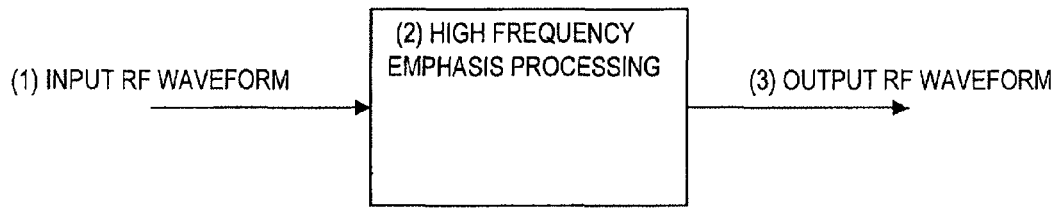
FIG. 3 is a block diagram (FIG. 3A), a characteristics diagram (FIG. 3B), and a timing chart (FIG. 3C) that show a high frequency emphasis processing according to the first embodiment.
Figure 3B:
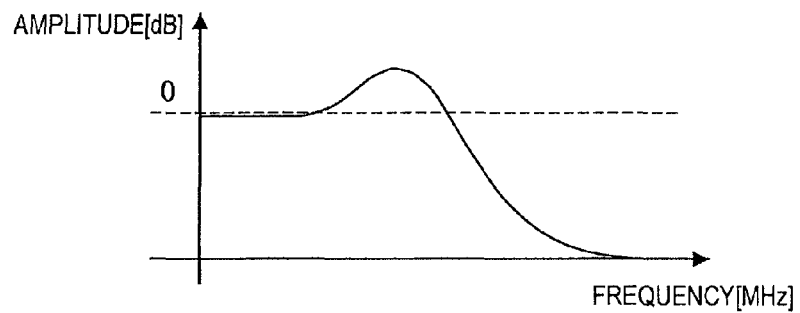
Figure 3C:
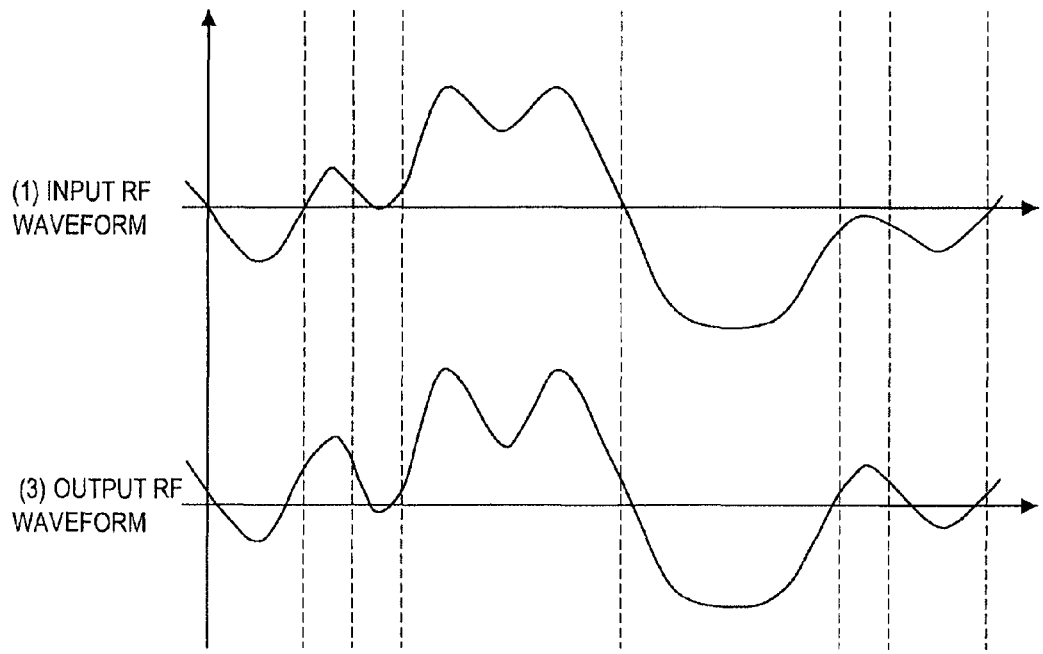

Accordingly, as shown in FIG. 3A, the high frequency emphasis processing of the waveform (1) of the signal that is read by the pickup and RF amp 106 can be performed by a high frequency emphasis processing portion (2) such that a signal in which the amplitude of a specified frequency is emphasized can be output (3). FIG. 3 is a block diagram (FIG. 3A), a characteristics diagram (FIG. 3B), and a timing chart (FIG. 3C) that show the high frequency emphasis processing according to the present embodiment. The high frequency emphasis processing can be performed by an ordinary FIR filter, for example. A detailed explanation of the FIR filter is omitted.

The FIR filter that is used for the high frequency emphasis processing can have frequency characteristics such as those shown in FIG. 3B, for example, and can amplify only the amplitude of a short cycle T. Because the amplitude of the short cycle T is amplified, the signal will reliably cross zero, as shown in FIG. 3C.

Because the RF data binarization after A/D conversion portion 118 performs the high frequency emphasis processing by the method described above, the possibility can be reduced that the playback signal will not cross zero when a short bit or a short space is formed in the optical disk 1 because the cycle T is short. On the other hand, noise is also emphasized in the signal that has undergone high frequency emphasis processing, so the signal is not suitable for audio or video data playback, but it can be used effectively for the detection of the frame synchronization signal by the FS detection portion 132, which is described later.

Next, the FS detection and synchronization protection portion 130 according to the present embodiment will be explained. The FS detection and synchronization protection portion 130 includes the FS detection portion 132, a synchronization state control and timing counter portion 134, and an FS synchronization protection setting register portion 136.

The FS detection portion 132 detects the frame synchronization signal in the playback signal data string that is binarized by the PR equalization and maximum likelihood decoding binarization portion 116. The FS detection portion 132 also detects the frame synchronization signal in the playback signal data string that is binarized by the RF data binarization after A/D conversion portion 118. The detection of the frame synchronization signal is performed by a pattern matching to a unique pattern that is defined as a synchronization pattern by the format of the optical disk 1.

For example, in the Blu-ray disc format, the unique pattern 9T9T is defined as the synchronization pattern. The FS detection portion 132 can therefore detect the frame synchronization signal by detecting 1000000001000000001 in an NRZ format data string of the binarized playback signal. Note that the synchronization protection 9T9T is always preceded by 2T, so 2T9T9T may also be detected.

The synchronization state control and timing counter portion 134 performs the synchronization protection based on the frame synchronization signal timing information that is detected by the FS detection portion 132. The synchronization state control and timing counter portion 134 then outputs the synchronization-protected frame synchronization signal timing to the demodulation and ECC correction/address decoding portion 150.

Next, the operation of the optical disk drive apparatus 100 according to the present embodiment will be explained. First, the synchronization protection operation of the FS detection and synchronization protection portion 130 according to the present embodiment will be explained with reference to FIGS. 4 to 6.

Figure 4:
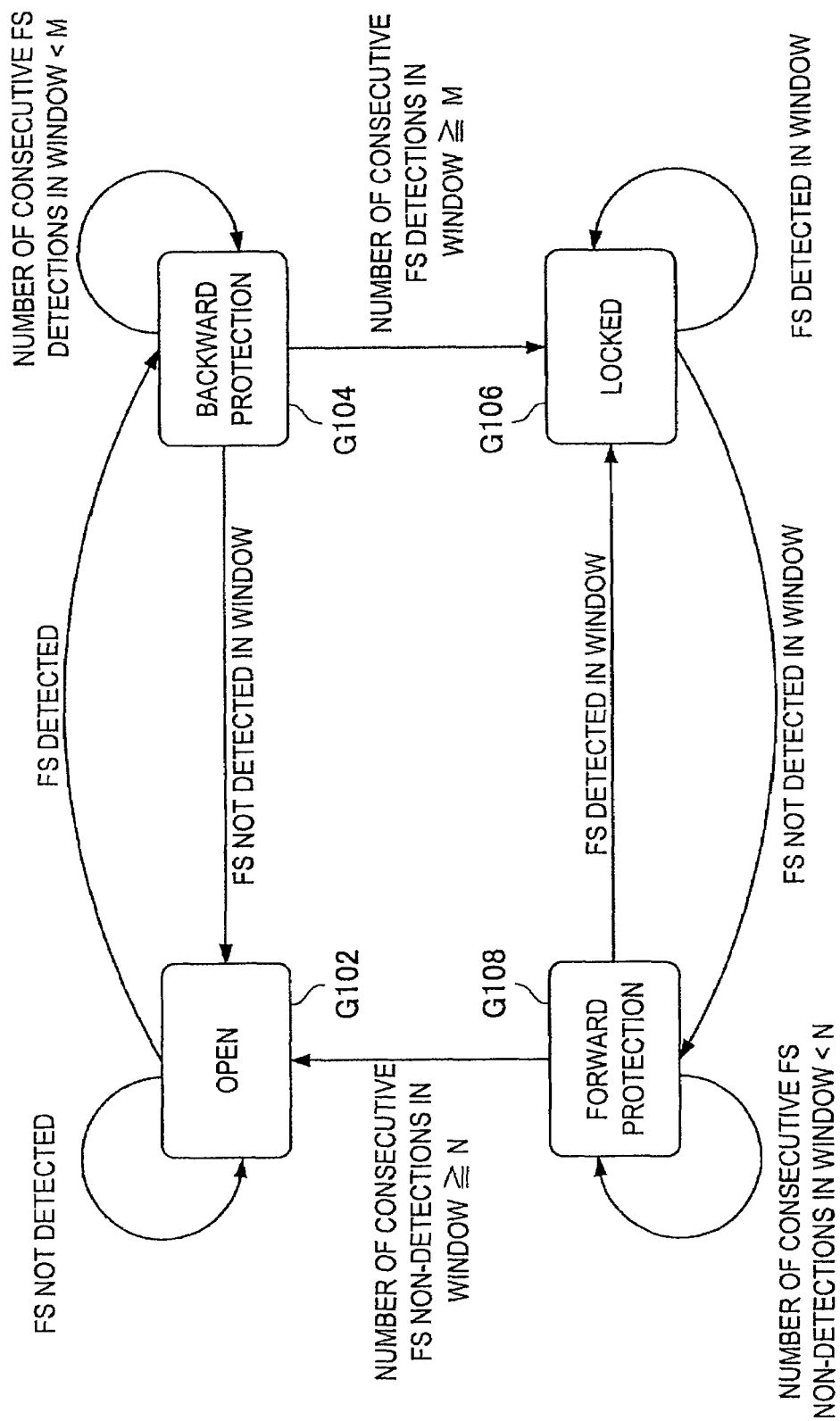
FIG. 4 shows a state transition diagram of four states of a frame synchronization signal (FS) synchronization protection and transitional states.
Figure 5:
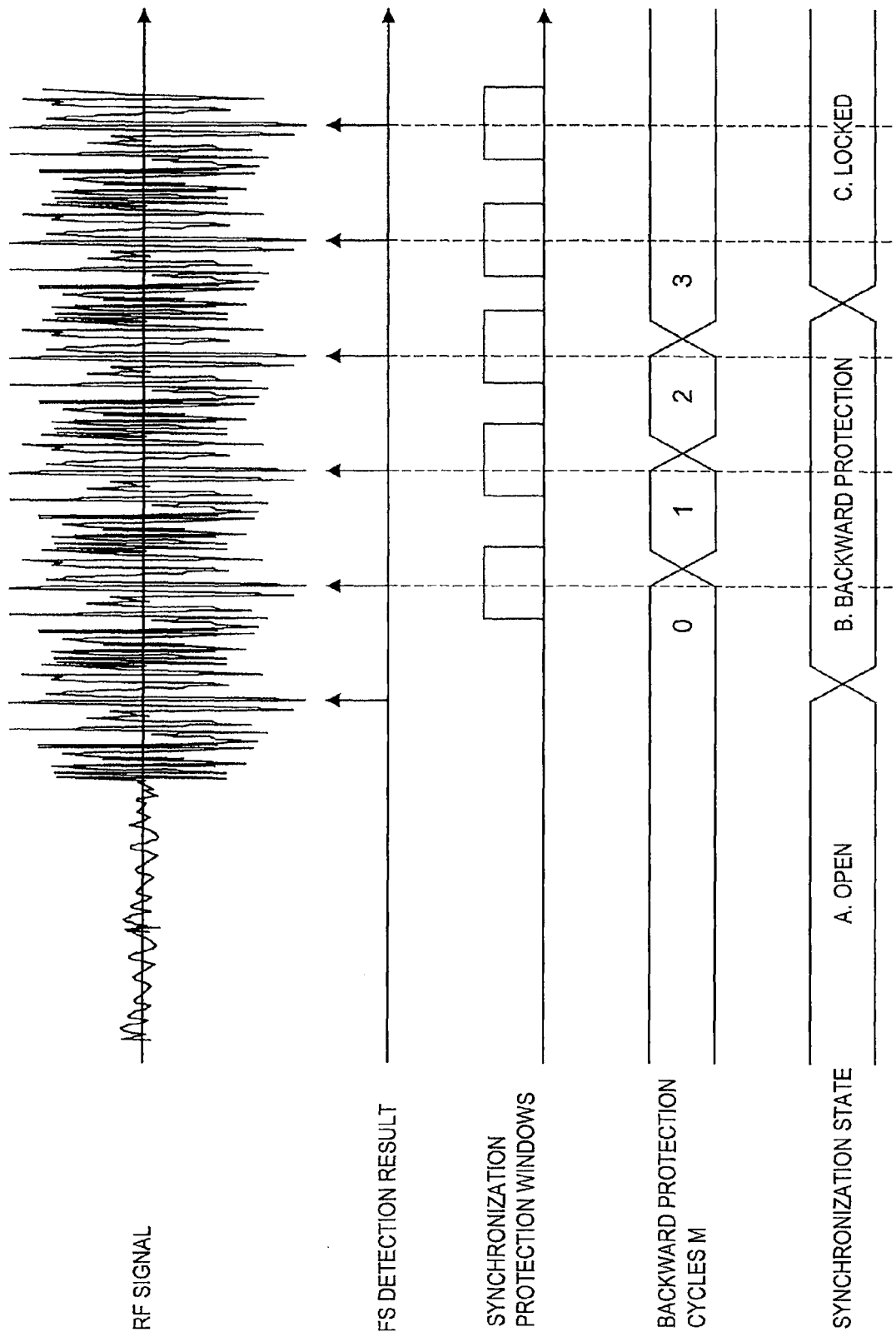
FIG. 5 is a timing chart of a transition from an open state to a locked state.
Figure 6:
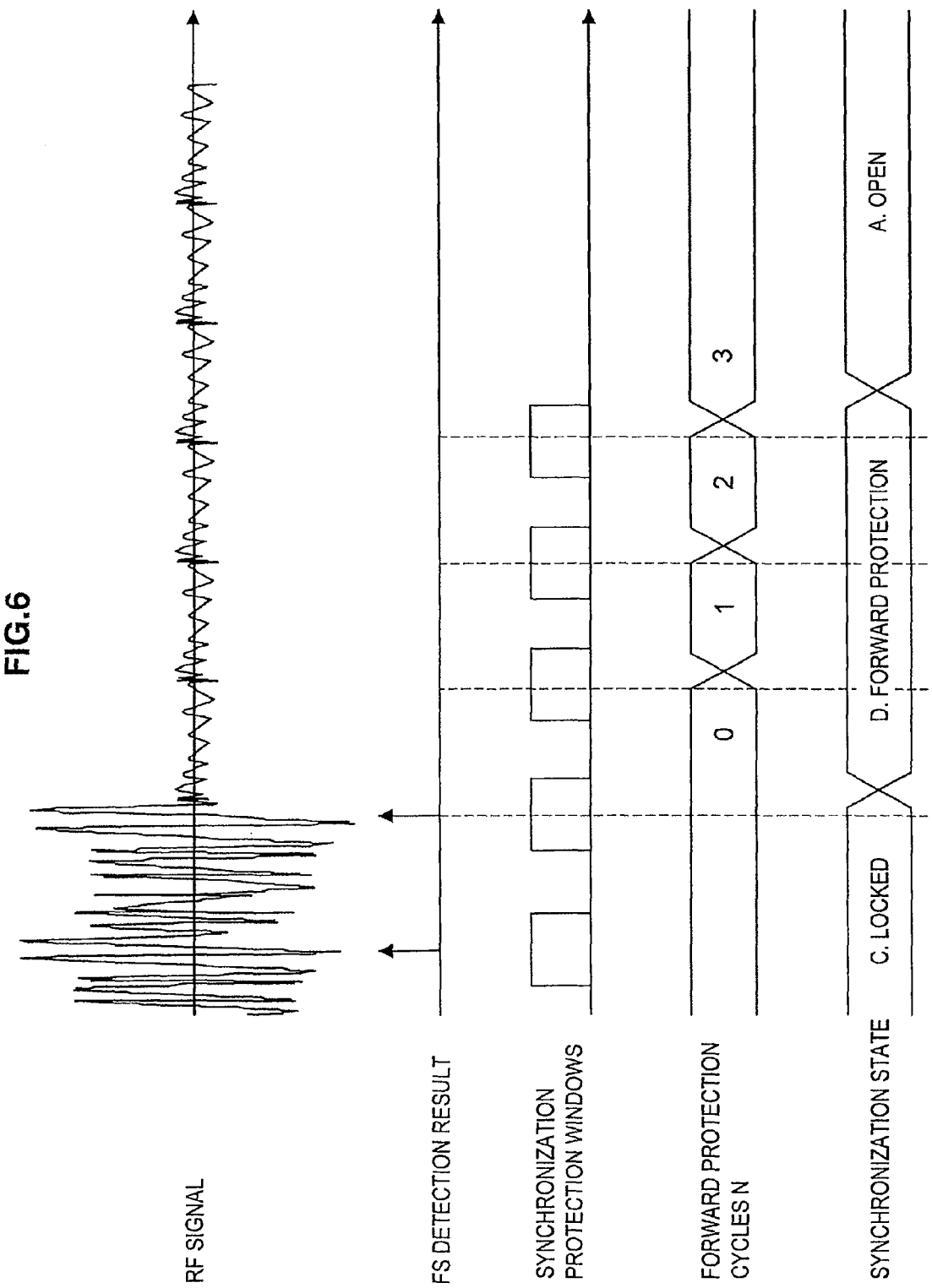
FIG. 6 is a timing chart of a transition from the locked state to the open state.

FIG. 4 shows a state transition diagram of four states of the synchronization protection of the frame synchronization signal, plus transitional states. FIG. 5 is a timing chart of a transition from an open state to a locked state. FIG. 6 is a timing chart of a transition from the locked state to the open state.

An open state G102 is an initial state or a state in which the playback signal (an RF signal) is not constant and the frame synchronization signal has not been detected. In FIG. 5(A), this is a transitional state in which the value of the RF signal is close to zero. Next, a case will be explained in which the synchronization protection transitions from the open state G102 through a backward protection state G104 to a locked state G106, as shown in FIG. 5.

In a case where the frame synchronization signal is detected in the open state G102, the synchronization protection transitions to the backward protection state G104. The backward protection state G104 is a state in which the timing information of the frame synchronization signal is used to check whether or not it is possible to transition to the locked state G106. Specifically, in the backward protection state G104, if the frame synchronization signal is detected at least M times within a window, the synchronization protection transitions to the locked state G106. FIG. 5 shows an example in which M is 3 times. On the other hand, in a case where the frame synchronization signal is not detected within the window in the backward protection state G104, the synchronization protection transitions to the open state G102.

Next, a case will be explained in which the synchronization protection transitions from the locked state G106 through a forward protection state G108 to the open state G102, as shown in FIG. 6. In a case where the frame synchronization signal is not detected within the window in the locked state G106, the synchronization protection transitions to the forward protection state G108. The forward protection state G108 is a state in which a check is performed to see if the frame synchronization signal is continuously not detected. Specifically, in the forward protection state G108, if the frame synchronization signal is not detected at least N consecutive times within a window, the synchronization protection transitions to the open state G102. FIG. 6 shows an example in which N is 3 times. On the other hand, in a case where the frame synchronization signal is detected in the forward protection state G108, the synchronization protection transitions to the locked state G106.

Figure 7:
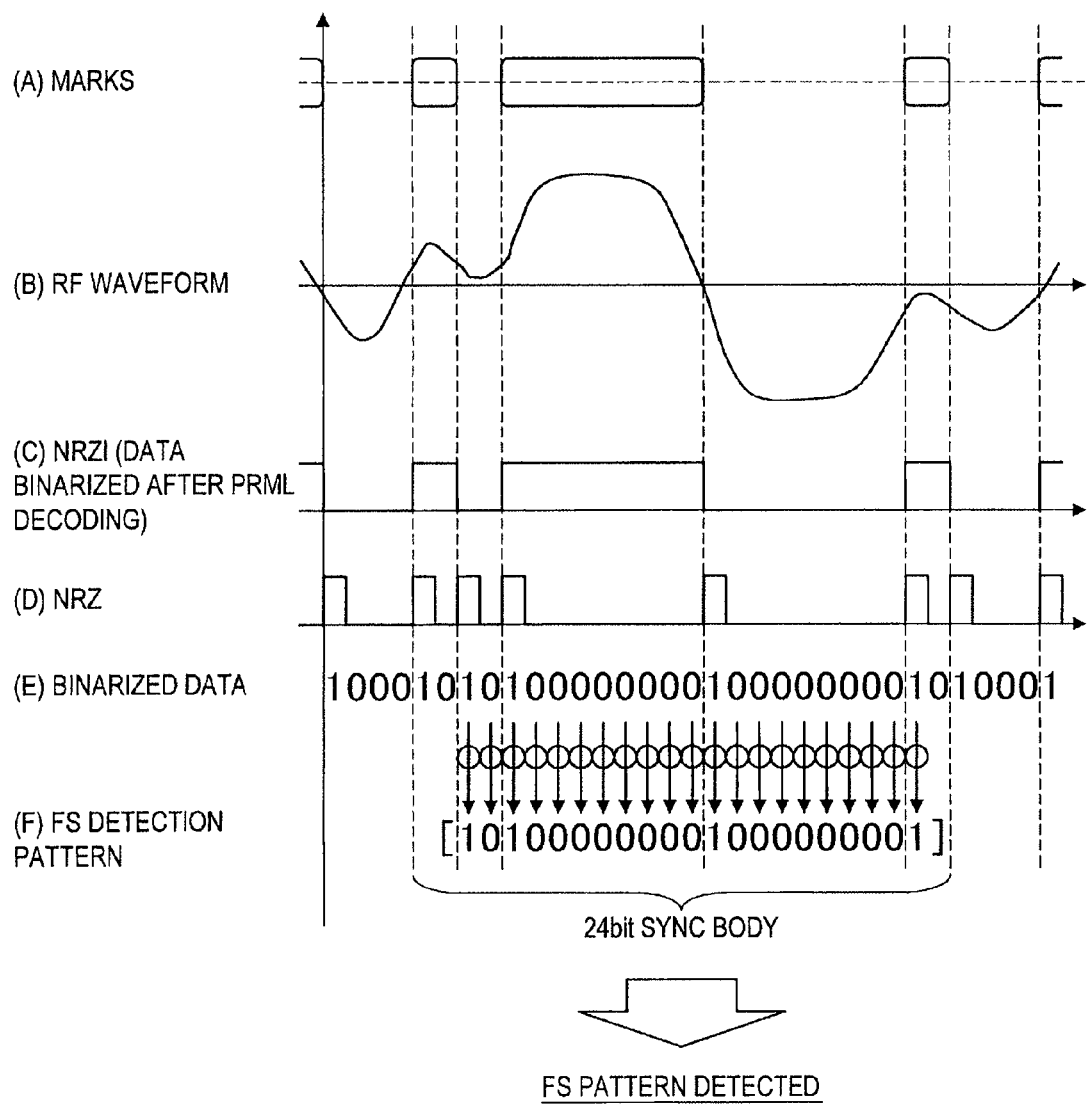
FIG. 7 is a timing chart that shows a detection of a frame in data that is binarized by a PRML method in a PR equalization and maximum likelihood decoding binarization portion according to the first embodiment of the present invention.
Figure 8:
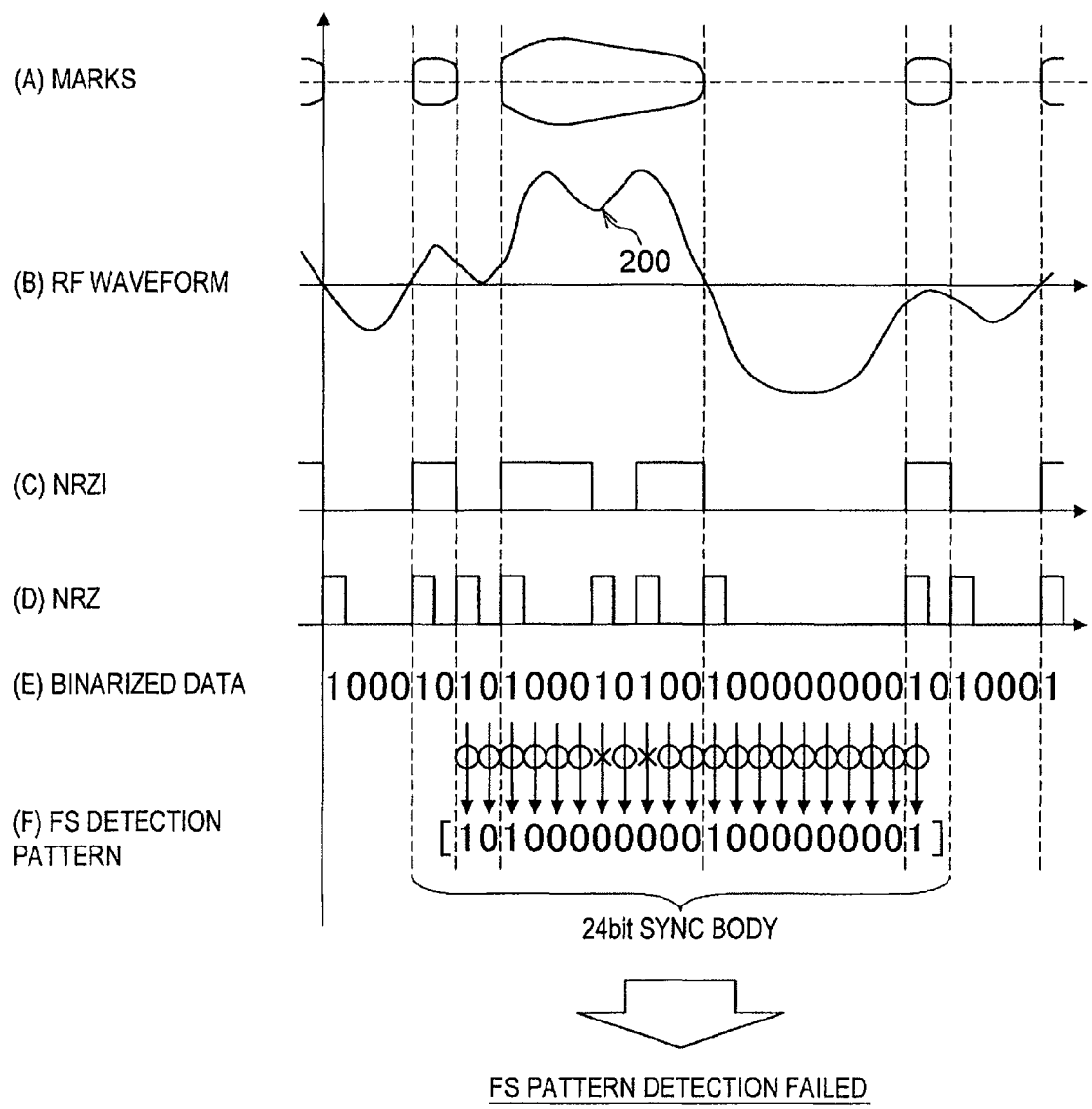
FIG. 8 is a timing chart that shows a known frame detection.
Figure 9A:
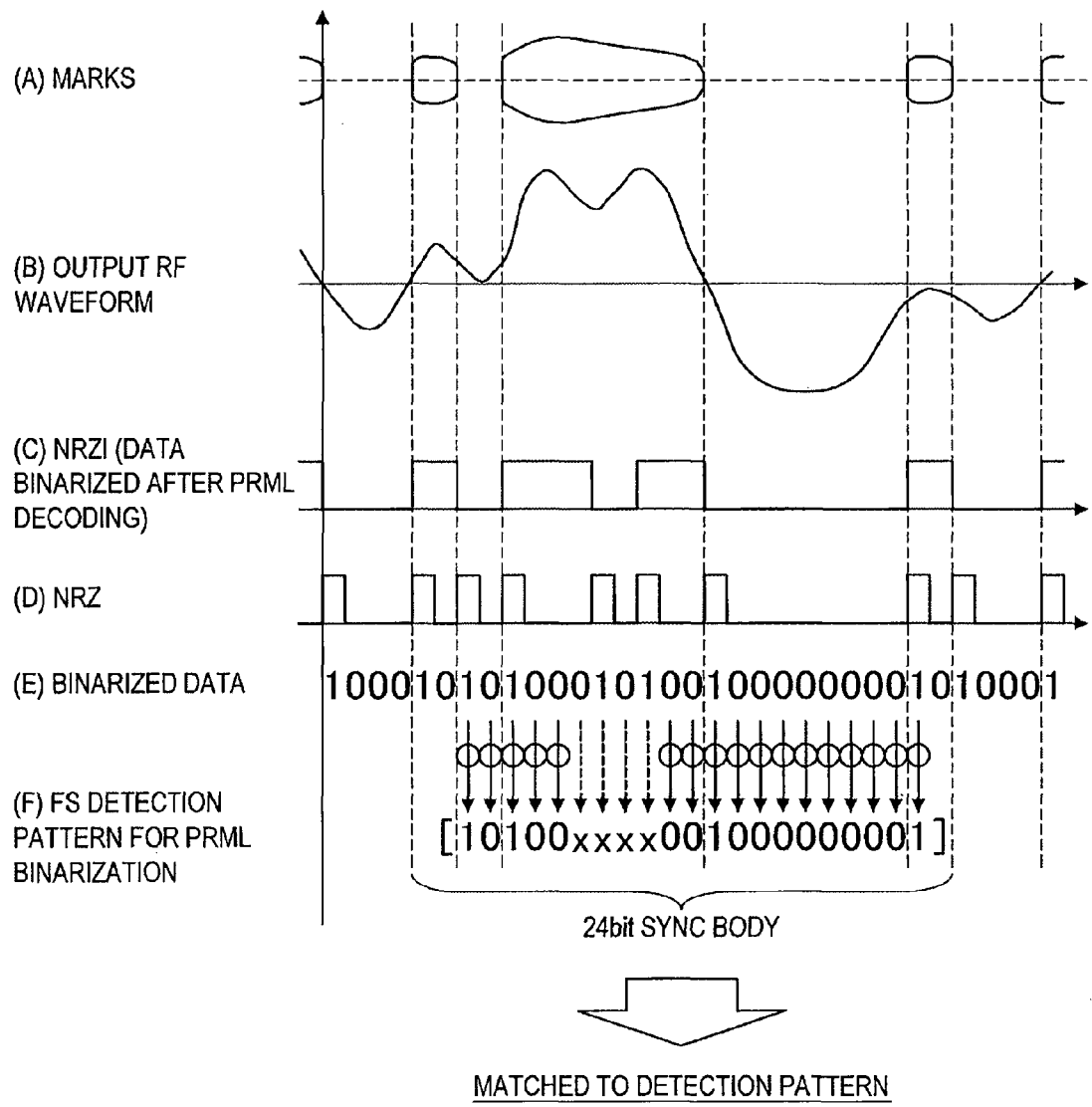
FIG. 9A is a timing chart that shows a detection of a frame in the data that is binarized by the PR equalization and maximum likelihood decoding binarization portion according to the first embodiment of the present invention.
Figure 9B:
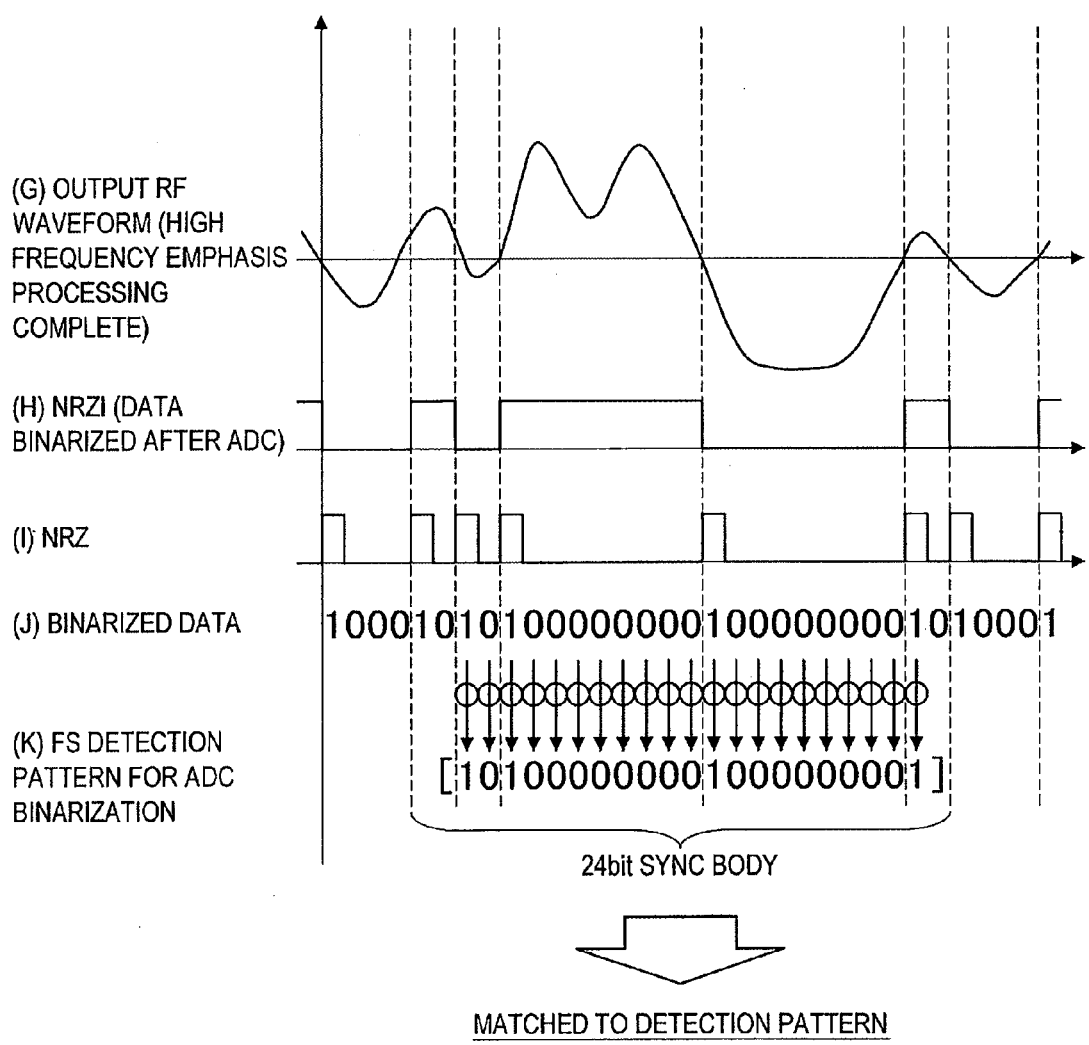
FIG. 9B is a timing chart that shows a detection of a frame in data that is binarized by an RF data binarization after A/D conversion portion according to the first embodiment.
Figure 10A:
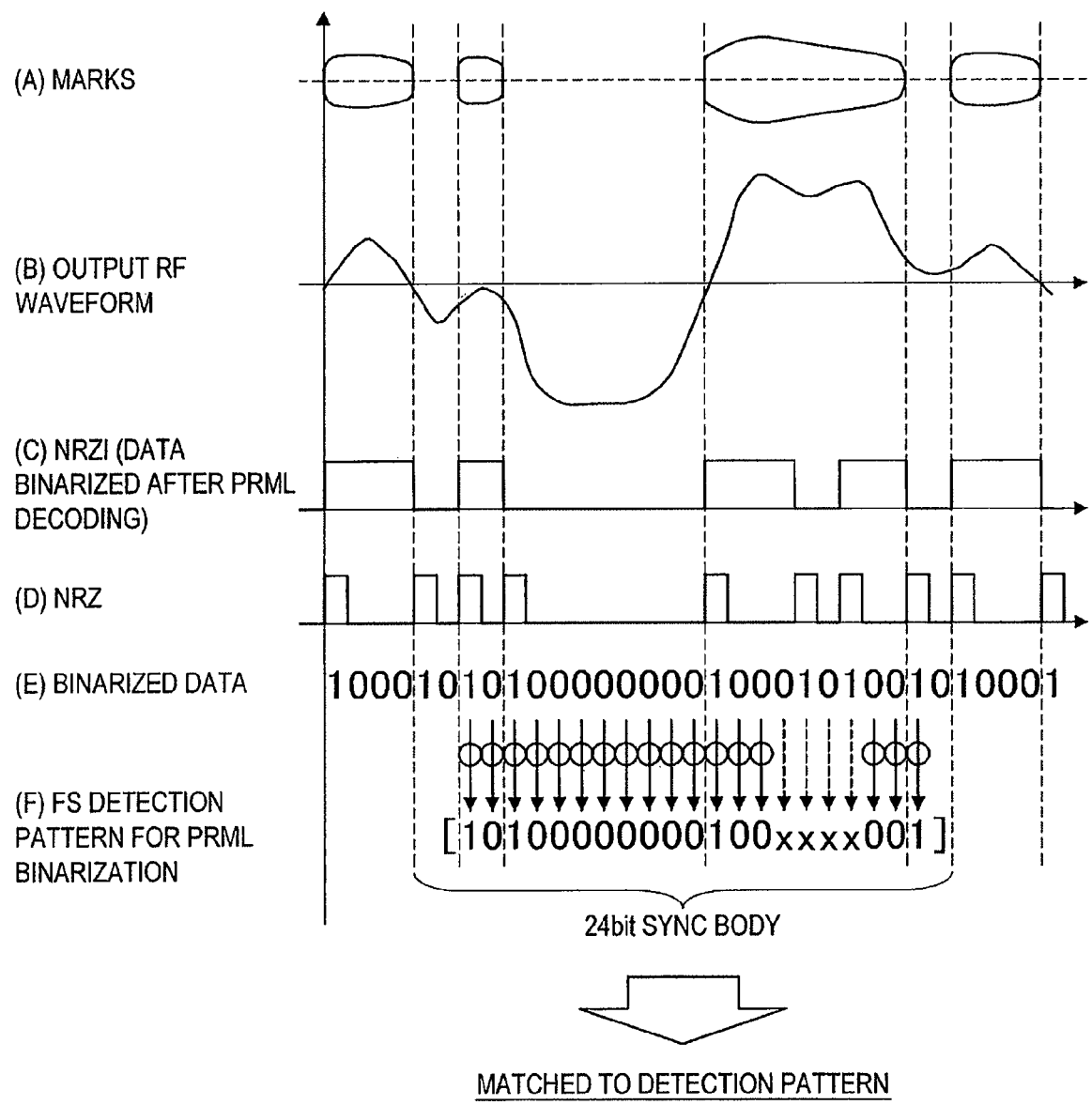
FIG. 10A is a timing chart that shows a detection of a frame in the data that is binarized by the PR equalization and maximum likelihood decoding binarization portion according to the first embodiment of the present invention.

Next, a frame detection operation according to the present embodiment will be explained. FIG. 7 is a timing chart that shows a detection of a frame in the data that is binarized by the PRML method in the PR equalization and maximum likelihood decoding binarization portion 116 according to the present embodiment. FIG. 8 is a timing chart that shows a known frame detection. FIGS. 9A and 9B are timing charts that show a detection of a frame in the data that is binarized by the PR equalization and maximum likelihood decoding binarization portion 116 and a detection of a frame in the data that is binarized by the RF data binarization after A/D conversion portion 118 according to the present embodiment. FIGS. 10A and 10B are timing charts that show a detection of a frame in the data that is binarized by the PR equalization and maximum likelihood decoding binarization portion 116 and a detection of a frame in the data that is binarized by the RF data binarization after A/D conversion portion 118 according to the present embodiment. FIGS. 9 and 10 show cases in which the sequences of the marks and the spaces are different.

First, the FS detection portion 132 detects the frame synchronization signal in the playback signal data string that was binarized by the PR equalization and maximum likelihood decoding binarization portion 116. In the case of a Blu-ray disc, a pattern match with the 9T9T synchronization pattern defined by the Blu-ray disc format is detected.

Specifically, as shown in FIG. 7, the optical disk drive apparatus 100 reads the marks and the spaces that are formed in the optical disk 1 (FIG. 7(A)). The waveform of the playback signal (the RF signal) can thus be obtained, as shown in FIG. 7(B). When the signal is binarized by the PR equalization and maximum likelihood decoding binarization portion 116, the NRZI signal shown in FIG. 7(C), the NRZ signal shown in FIG. 7(D), which is a conversion of the NRZI signal, and the binarized playback signal data string shown in FIG. 7(E) are obtained. Next, the FS detection portion 132 performs pattern matching between the binarized data string shown in FIG. 7(E), which is based on the NRZ signal, and the synchronization pattern shown in FIG. 7(F). FIG. 7 shows that the binarized data string shown in FIG. 7(E) matches the synchronization pattern shown in FIG. 7(F), such that the synchronization pattern can be detected.

Further, in the example in FIG. 7 described above, even if the waveform does not cross zero during the short cycle T, as shown in FIG. 7(B), the binarization processing by the PRML method makes it possible to detect the correct cycle T, as shown by the NRZI signal in FIG. 7(C).

Figure 11:
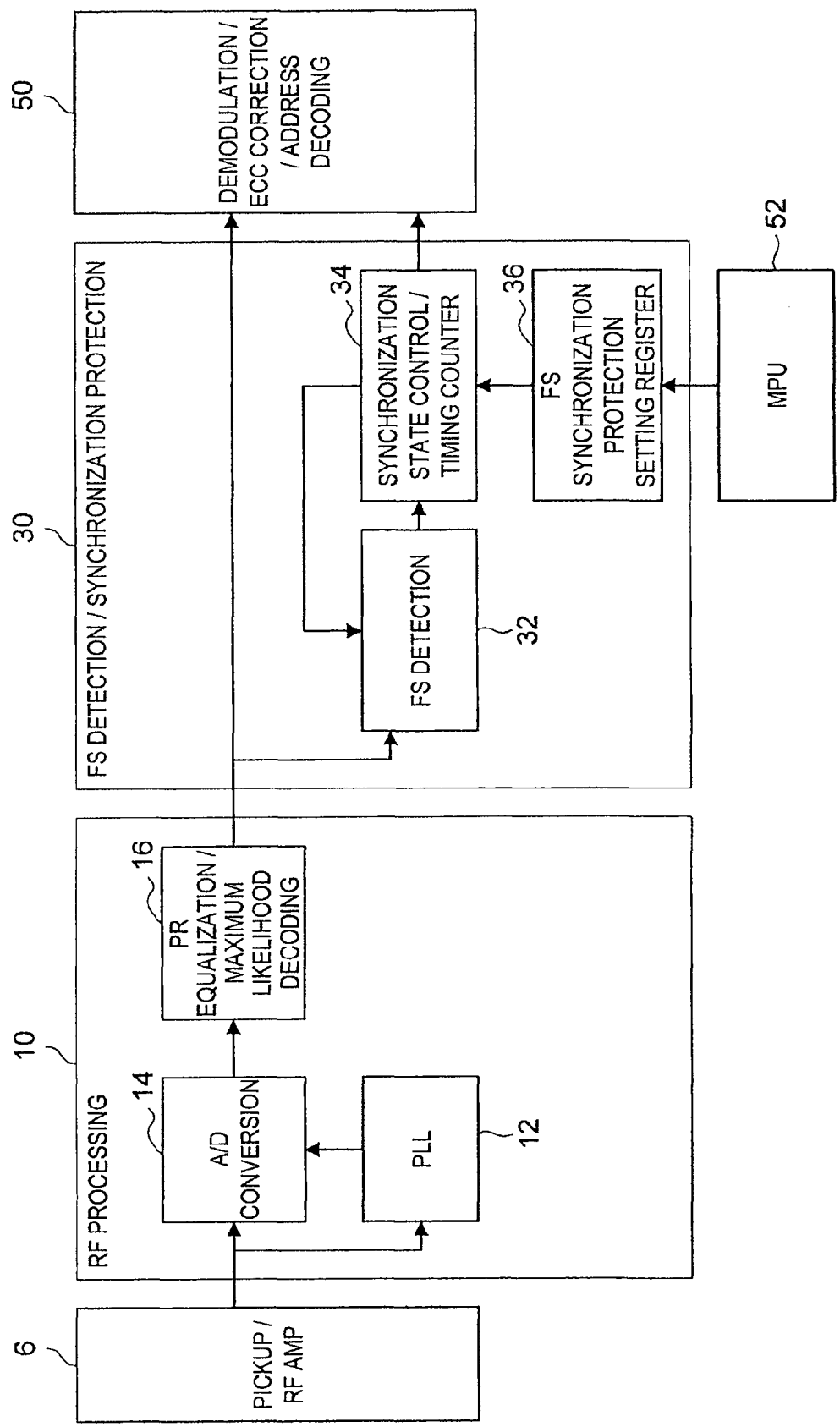
FIG. 11 is a block diagram that shows an RF processing portion and an FS detection and synchronization protection portion of a known optical disk drive apparatus.

Next, by way of contrast, a case will be explained in which the marks are recorded in the optical disk 1 in a less orderly manner than the marks in FIG. 7(A) and have irregular shapes, as shown in FIG. 8(A). In the example in FIG. 8(A), a portion of each mark is wider. In this case, as indicated by the (200) in FIG. 8(B), a dip is detected in a part of the playback signal waveform that corresponds to a wide part of a mark. Incidentally, in a known optical disk drive apparatus having a configuration like that shown in FIG. 11, an RF processing portion 10 binarizes the signal by the PRML method using only a PR equalization and maximum likelihood decoding binarization portion 16. When the detected playback signal waveform, in which the dip is formed, is binarized by the PR equalization and maximum likelihood decoding binarization portion 16, an undesirable, incorrectly binarized result is produced, as shown in FIG. 8(C), even though the waveform does not cross zero.

At this time, an FS detection portion 32 of the known optical disk drive apparatus has a synchronization pattern (A) as shown in Table 1.

Thus, when the known optical disk drive apparatus processes the signal, the binarized data string in FIG. 8(E) does not match the synchronization pattern shown in FIG. 8(F). Therefore, although the synchronization pattern should be detected, because the correct synchronization pattern 9T9T is recorded, the synchronization pattern is sometimes not detected, as in the example in FIG. 8.

TABLE 1

| Pattern No. | FS detection pattern (A) in data binarized after PRML decoding | Example of detection of pattern (A) (NRZ) |
|---|---|---|
| 1 | 2T9T9T | 101000000001000000001 |

In the known optical disk drive apparatus, as described above, because the FS detection portion 32 detects the frame synchronization signal using only the playback signal data string that is binarized by the PR equalization and maximum likelihood decoding binarization portion 16, there is a risk that the correct synchronization pattern cannot be detected.

In the present embodiment, the RF processing portion 110 includes the RF data binarization after A/D conversion portion 118 in addition to the PR equalization and maximum likelihood decoding binarization portion 116. Therefore, the FS detection portion 132 can also detect the frame synchronization signal in the playback signal data string that is binarized by the RF data binarization after A/D conversion portion 118.

This will be explained in concrete terms below. In FIGS. 9A and 9B, a case is shown in which the 9T9T part is recorded in the optical disk 1 such that a mark is followed by a space.

FIGS. 9A(A) to 9A(E) show a case where the signal is binarized by the PRML method in the PR equalization and maximum likelihood decoding binarization portion 116, in the same manner as in FIG. 8.

This time, the FS detection portion 132 has the synchronization patterns (B) shown in Table 2, for example. That is, the expected synchronization pattern is 9T9T, but the FS detection portion 132 according to the present embodiment also has a detection pattern of uTvTwT9T (u+v+w=9) in anticipation of obtaining data that is binarized incorrectly by the PRML method. This time, predictable data patterns, such as [u=2, v=5, w=2], [u=3, v=4, w=2], and the like, for example, are stored as detection patterns in the FS detection portion 132.

Note that it is possible to fix the values of the first and last bits of uTvTwT, such that a detection pattern that excludes the first and last bits can be generated. This makes it possible to reduce the number of variations in the detection patterns that must be set in advance for pattern matching. Reducing the number of the detection patterns also makes it possible to perform the detection of the synchronization pattern more quickly.

Note that the uTvTwT9T (u+v+w=9) detection pattern is used in a case where the 9T9T part is recorded in the optical disk 1 such that a mark is followed by a space. This is because the misreading of the data is caused by the shapes of the bits in the optical disk 1.

TABLE 2

| Pattern No. | FS detection pattern (A) in data binarized after PRML decoding | Example of detection of pattern (A) (NRZ) | FS detection pattern (B) in data binarized after ADC | Example of detection of pattern (B) (NRZ) |
|---|---|---|---|---|
| 1 | 2T9T9T | 101000000001000000001 | don't care | — |
| 2 | 2TuTvTwT9T | 10100xxxx001000000001 | 2T9T9T | 101000000001000000001 |
| 3 | 2T9TuTvTwT | 10100000000100xxxx001 | 2T9T9T | 101000000001000000001 |

Therefore, the FS detection portion 132 performs the pattern matching of the binarized data in FIG. 9A(E) to the synchronization patterns in Table 2. The result is that the binarized data in FIG. 9A(E) matches the uTvTwT9T (u+v+w=9) detection pattern. There is therefore a possibility that the binarized data in FIG. 9A(E) includes the expected synchronization pattern 9T9T.

Where there is a possibility that the data that is binarized by the PR equalization and maximum likelihood decoding binarization portion 116 includes the synchronization pattern, the FS detection portion 132 performs the detection of the frame synchronization signal by checking the playback signal data string that is binarized by the RF data binarization after A/D conversion portion 118.

FIG. 9B(G) shows the waveform of the playback signal (the RF signal) that results from the high frequency emphasis processing by the RF data binarization after A/D conversion portion 118 after the marks and spaces that are formed in the optical disk 1 are read by the pickup. In FIG. 9B(G), the parts of the waveform that did not cross zero in FIG. 9A(B), due to the short cycle T, now cross zero. When the signal is binarized by the RF data binarization after A/D conversion portion 118, the NRZI signal shown in FIG. 9B(H), the NRZ signal shown in FIG. 9B(I), which is a conversion of the NRZI signal, and the binarized playback signal data string shown in FIG. 9B(J) are obtained.

Therefore, the FS detection portion 132 performs pattern matching between the binarized data string shown in FIG. 9B(J), which is based on the NRZ signal, and the synchronization patterns (B) in Table 2. FIG. 9B shows that the binarized data string shown in FIG. 9B(J) matches the synchronization pattern shown in FIG. 9B(K) (a synchronization pattern (B) in Table 2), such that the synchronization pattern can be detected.

As described above, in a case where the synchronization pattern cannot be detected in the binarized data string produced by the PR equalization and maximum likelihood decoding binarization portion 116 using the PRML method, the synchronization pattern can be detected by checking the data string that is binarized by the RF data binarization after A/D conversion portion 118. This improves the capacity to detect the frame synchronization signal, such that the frame synchronization signal can be detected in a stable manner, with few detection errors.

It should be understood by those skilled in the art that various modifications, combinations, sub-combinations and alterations may occur depending on design requirements and other factors insofar as they are within the scope of the appended claims or the equivalents thereof.

For example, the detection of the frame synchronization signal in the present embodiment in FIGS. 9A and 9B has been explained using a case in which the 9T9T part is recorded in the optical disk 1 such that a mark is followed by a space. However, the present invention is not limited to this example. For example, it is possible to detect the frame synchronization signal in the same manner, even in a case where the 9T9T part is recorded in the optical disk 1 such that a space is followed by a mark, as shown in FIGS. 10A and 10B. The FS detection portion 132 has the uTvTwT9T (u+v+w=9) detection pattern in advance, as shown in Table 2. The FS detection portion 132 performs pattern matching between the binarized data string in FIG. 10A(E) and the synchronization patterns in Table 2. The result is that the binarized data string in FIG. 10A(E) matches the uTvTwT9T (u+v+w=9) detection pattern. The FS detection portion 132 therefore determines that there is a possibility that the binarized data in FIG. 9A(E) includes the expected synchronization pattern 9T9T. The FS detection portion 132 then performs the detection of the frame synchronization signal by checking the playback signal data string that is binarized by the RF data binarization after A/D conversion portion 118.

Furthermore, in the present embodiment, an example has been explained in which the synchronization pattern is defined by the Blu-ray disc format, but the present invention is not limited to this example. For example, the present invention can be used even in a case where the partial response maximum likelihood decoding processing is performed in the playback of a recording medium such as a compact disc (CD), a DVD, or the like. That is, the present invention can be used even for synchronization patterns that are defined by various recording medium formats.

Specifically, for the DVD, the unique pattern that is defined by the format as the synchronization pattern is 14T4T. Therefore, in the detection of the frame synchronization signal, the synchronization pattern detection performance can be improved by using the detection patterns that are shown in Table 3.

TABLE 3

| Pattern No. | FS detection pattern (A) in data binarized after PRML decoding | Example of detection of pattern (A) (NRZ) | FS detection pattern (B) in data binarized after ADC | Example of detection of pattern (B) (NRZ) |
|---|---|---|---|---|
| 1 | 14T4T | 1000000000000010001 | don't care | — |
| 2 | uTvTwT4T (u + v + w = 14) | 100xxxxxxxxx0010001 | 14T4T | 1000000000000010001 |

Moreover, for the CD, the unique pattern that is defined by the format as the synchronization pattern is 11T11T. Therefore, in the detection of the frame synchronization signal, the synchronization pattern detection performance can be improved by using the detection patterns that are shown in Table 4.

TABLE 4

| Pattern No. | FS detection pattern (A) in data binarized after PRML decoding | Example of detection of pattern (A) (NRZ) | FS detection pattern (B) in data binarized after ADC | Example of detection of pattern (B) (NRZ) |
|---|---|---|---|---|
| 1 | 11T11T | 10000000000100000000001 | don't care | — |
| 2 | uTvTwT11T (u + v + w = 11) | 100xxxxxx00100000000001 | 11T11T | 10000000000100000000001 |
| 3 | 11TuTvTwT (u + v + w = 11) | 10000000000100xxxxxx001 | 11T11T | 10000000000100000000001 |

Furthermore, in the present embodiment, an example has been explained in which, because the synchronization pattern for the Blu-ray disc format is 9T9T, the synchronization pattern is a combination made up of only a unique T length (9T) that occurs only in the synchronization pattern. However, the present invention is not limited to this example. For example, as with the DVD, the synchronization pattern may also be a combination made up of a unique T length (14T for the DVD) and a non-unique T length (4T for the DVD) that also occurs elsewhere than in the synchronization pattern. Moreover, as with the CD, the synchronization pattern may also be a combination made up of only a non-unique T length (11T for the CD).

In the present embodiment, the notation uTvTwT indicates that the misread unique pattern is divided in to three parts, but the present invention is not limited to this example. For example, the run length increases according to the recording medium format, so the unique pattern is not limited to being divided in to three parts and may also be divided in to more than three parts.

In the present embodiment, the RF data binarization after A/D conversion portion 118 performs the binarization by detecting the timing at which the signal crosses zero, but the present invention is not limited to this example. For example, the RF data binarization after A/D conversion portion 118 may also set a specified threshold value between zero and a maximum value of the RF waveform, then perform the binarization using the threshold value.

In the present embodiment, in a case where the PR equalization and maximum likelihood decoding binarization portion 116 does not detect the synchronization pattern, the signal that is obtained from the synchronization pattern detected by the RF data binarization after A/D conversion portion 118 is used as the frame synchronization signal, but the present invention is not limited to this example. For example, the synchronization pattern may be detected only in the binarized data string produced by the RF data binarization after A/D conversion portion 118, and the signal obtained from the synchronization pattern may be used as the frame synchronization signal. The data that is processed by the PR equalization and maximum likelihood decoding binarization portion 116 may then be used only for the playback of the data, such as audio data, video data, or the like, without being used for the detection of the synchronization pattern. In this case, the signal flow shown in FIG. 2 from the PR equalization and maximum likelihood decoding binarization portion 116 to the FS detection portion 132 does not occur in the optical disk drive apparatus 100.

What is claimed is:

1. A recording medium playback device, comprising:
a first binarization portion that, using a partial response maximum likelihood decoding processing, binarizes a signal that is read from data that is recorded in a recording medium;
a second binarization portion that binarizes the signal based on a magnitude relationship to a specified threshold value; and
a frame synchronization signal detection portion that detects a frame synchronization signal in data that have been processed by the first binarization portion and the second binarization portion, the frame synchronization signal detection portion including
a first frame synchronization signal detection portion that detects a synchronization pattern in a first binarized data string that is produced by the first binarization portion, and determines by a pattern matching whether the first binarized data string is the synchronization pattern and whether the first binarized data string is a detection pattern, and
a second frame synchronization signal detection portion that detects a synchronization pattern in a second binarized data string that is produced by the second binarization portion,
wherein if the synchronization pattern is not detected by the first frame synchronization signal detection portion, a signal that is derived from the synchronization pattern that is detected by the second frame synchronization signal detection portion is used as the frame synchronization signal.

2. The recording medium playback device according to claim 1,
the first frame synchronization signal detection portion determines by a pattern matching whether the first binarized data string, minus a specified bit, is the synchronization pattern and whether the first binarized data string, minus the specified bit, is a detection pattern, and
when the synchronization pattern is not detected in the first binarized data string, minus the specified bit, and the detection pattern is detected,
the signal that is derived from the synchronization pattern that is detected by the second frame synchronization signal detection portion is used as the frame synchronization signal.

3. The recording medium playback device according to claim 1,
wherein the second binarization portion performs a high frequency emphasis processing of the signal that is read from the recording medium before binarizing the signal.

4. A recording medium playback device, comprising:
a first binarization portion that, using a partial response maximum likelihood decoding processing, binarizes a signal that is read from data that is recorded in a recording medium; and
a second binarization portion that binarizes the signal based on a magnitude relationship to a specified threshold value,
a frame synchronization signal detection portion for detecting a binarized data string that is produced by the second binarization portion, by determining a pattern match to detect whether the binarized data string is the synchronization pattern and whether the binarized data string is a detection pattern, and a signal that is derived from the synchronization pattern is used as a frame synchronization signal, and
the data that is processed by the first binarization portion is used only for playback of the data.

5. A recording medium playback method, comprising the steps of:
binarizing, using a partial response maximum likelihood decoding processing, a signal that is read from data that is recorded in a recording medium;
binarizing the signal based on a magnitude relationship to a specified threshold value; and
detecting a frame synchronization signal in data that have been processed by the binarizing of the signal using the partial response maximum likelihood decoding processing and the binarizing of the signal based on the magnitude relationship to the specified threshold value, the detecting of the frame synchronization signal including
detecting a synchronization pattern in a first binarized data string that is produced by the binarizing of the signal using the partial response maximum likelihood decoding processing, by determining a pattern match indicating whether the first binarized data string is the synchronization pattern and whether the first binarized data string is a detection pattern, and
detecting a synchronization pattern in a second binarized data string that is produced by the binarizing of the signal based on the magnitude relationship to the specified threshold value,
wherein if the synchronization pattern is not detected in the first binarized data string, a signal that is derived from the synchronization pattern that is detected in the second binarized data string is used as the frame synchronization signal.

6. The recording medium playback method according to claim 5, wherein
the detecting of the synchronization pattern in the first binarized data string determines by a pattern matching whether the first binarized data string, minus a specified bit, is the synchronization pattern and whether the first binarized data string, minus the specified bit, is a detection pattern, and
when the synchronization pattern is not detected in the first binarized data string, minus the specified bit, and the detection pattern is detected,
the signal that is derived from the synchronization pattern that is detected in the second binarized data string is used as the frame synchronization signal.

7. The recording medium playback method according to claim 5,
wherein a high frequency emphasis processing of the signal that is read from the recording medium is performed before the binarizing of the signal based on the magnitude relationship to the specified threshold value.

8. A recording medium playback method, comprising the steps of:
binarizing, using a partial response maximum likelihood decoding processing, a signal that is read from data that is recorded in a recording medium; and
binarizing the signal based on a magnitude relationship to a specified threshold value,
wherein a synchronization pattern is detected in a binarized data string that is produced by the binarizing of the signal based on the magnitude relationship to the specified threshold value, and a signal that is derived from the synchronization pattern is used as a frame synchronization signal, by determining a pattern match indicating whether the binarized data string is the synchronization pattern and whether the binarized data string is a detection pattern, and
the data that is processed by the binarizing of the signal using the partial response maximum likelihood decoding processing is used only for playback of the data.

* * * * *